(12) United States Patent
Witham

(10) Patent No.: US 12,475,512 B2
(45) Date of Patent: Nov. 18, 2025

(54) COMPLEX NUMBER TOKENIZATION USING A DISTRIBUTED LEDGER

(71) Applicant: Larry Randal Witham, San Jose, CA (US)

(72) Inventor: Larry Randal Witham, San Jose, CA (US)

(73) Assignee: LAPAIN, LLC

( * ) Notice: Subject to any disclaimer, the term of this patent is extended or adjusted under 35 U.S.C. 154(b) by 0 days.

(21) Appl. No.: 18/782,727

(22) Filed: Jul. 24, 2024

(65) Prior Publication Data

US 2024/0378671 A1   Nov. 14, 2024

Related U.S. Application Data

(62) Division of application No. 17/702,251, filed on Mar. 23, 2022, now Pat. No. 12,079,868.

(Continued)

(51) Int. Cl.
*G06Q 40/04* (2012.01)
*H04L 9/06* (2006.01)

(52) U.S. Cl.
CPC ........... *G06Q 40/04* (2013.01); *H04L 9/0643* (2013.01); *H04L 2209/56* (2013.01)

(58) Field of Classification Search
CPC ... G06Q 40/04; H04L 9/0643; H04L 2209/56; H04L 2209/42; H04L 9/50; G06F 21/64
See application file for complete search history.

(56) References Cited

U.S. PATENT DOCUMENTS

| 2018/0268382 A1* | 9/2018 | Wasserman | H04L 9/3247 |
| 2019/0043043 A1* | 2/2019 | Saraniecki | H04L 9/3268 |

(Continued)

FOREIGN PATENT DOCUMENTS

| AU | 2019203281 A1 | 11/2019 |
| WO | WO-2019/242285 A1 | 12/2019 |

OTHER PUBLICATIONS

Desrochers, Alan A., Thomas J. Deal, and Maria Pia Fante. "Complex-Valued Token Petri Nets;" IEEE Transactions On Automation Science and Engineering, vol. 2, No. 4, Oct. 2005 (Year: 2005).*

(Continued)

*Primary Examiner* — Elda G Milef
(74) *Attorney, Agent, or Firm* — MARSHALL, GERSTEIN & BORUN LLP

(57) ABSTRACT

To record an exchange of value in a distributed ledger, a client device interacts with a distributed ledger maintained by participants in a distributed ledger network, for example via a digital wallet. The distributed ledger includes a set of consensus rules including at least one consensus rule that digital token values recorded in the distributed ledger include complex values having at least two components. The client device generates a transaction indicating an exchange of value of a digital token having at least two components, where the transaction is stored in the distributed ledger, and transmits the transaction to at least one other participant in a distributed ledger network of participants maintaining the distributed ledger. The participants append data to the distributed ledger in response to determining that the data satisfies the set of consensus rules.

14 Claims, 13 Drawing Sheets

Related U.S. Application Data

(60) Provisional application No. 63/262,741, filed on Oct. 19, 2021, provisional application No. 63/256,498, filed on Oct. 15, 2021.

(56) References Cited

U.S. PATENT DOCUMENTS

2021/0352471 A1* 11/2021 Hallock .................. G06N 7/01
2022/0027992 A1* 1/2022 Blevins ................ H04L 9/3247

OTHER PUBLICATIONS

Vasile, Iulia. "Digital Tokens 101: What Is a Digital Token?" Apr. 5, 2019, < Digital Tokens 101: What is a digital token?—Beginners Guide> (Year: 2019).*
Search Report and Written Opinion in International Application No. PCT/US2022/021473 dated Jul. 8, 2022, 14 pages.
International Preliminary Report on Patentability in International Application No. PCT/US2022/021473 dated Sep. 19, 2023, 7 pages.
Office Action for U.S. Appl. No. 17/702,251, dated Apr. 18, 2024.
Lei Hang, Do-Hyeun Kim, "Optimal blockchain network construction methodology based on analysis of configurable components for enhancing Hyperledger Fabric performance," Blockchain: Research and Applications. vol. 2 Iss. 1, Mar. 2021. (Year: 2021).

* cited by examiner

500

| Order Book | | | Depth 0.5 ⌄5 |
|---|---|---|---|
| Price | Qty | | Total |
| 5 | 37,209 | | 2,613,623 |
| -5 | 251,375 | | 2,576,414 |
| 4+3i | 410,593 | | 2,325,039 |
| 4-3i | 230,381 | | 1,914,446 |
| 3+4i | 200,480 | | 1,684,065 |
| 3-4i | 1,483,585 | | 1,483,585 |
| -3-4i | | | |
| -3-4i | 1,207,035 | | 1,207,035 |
| -3+4i | 125,009 | | 1,332,044 |
| 2.72+4.2i | 2 | | 1,332,046 |
| 2.72-4.2i | 770 | | 1,332,816 |
| -2.72+4.2i | 14,157 | | 1,346,973 |
| -2.72-4.2i | 31,685 | | 1,378,658 |

Labels: 3. (upper price group), 1. (-3-4i row), 4. (lower price group)

| Order Book | | | Depth 0.5 ⌄5. |
|---|---|---|---|
| Price | Qty | | Total |
| $5e^{i0}$ | 37,209 | | 2,613,623 |
| $5e^{i\pi/4}$ | 251,375 | | 2,576,414 |
| $5e^{i\pi/2}$ | 410,593 | | 2,325,039 |
| $5e^{i3\pi/4}$ | 230,381 | | 1,914,446 |
| $5e^{i\pi}$ | 200,480 | | 1,684,065 |
| $5e^{i5\pi/4}$ | 1,483,585 | | 1,483,585 |
| 1. $5e^{i3\pi/2}$ | | | |
| $5e^{i3\pi/2}$ | 1,207,035 | | 1,207,035 |
| $5e^{i7\pi/4}$ | 125,009 | | 1,332,044 |
| $4.9e^{i0}$ | 2 | | 1,332,046 |
| $4.9e^{i\pi/4}$ | 770 | | 1,332,816 |
| $4.9e^{i\pi/2}$ | 14,157 | | 1,346,973 |
| $4.9e^{i3\pi/4}$ | 31,685 | | 1,378,658 |

(Labels 3. and 4. mark the upper and lower price groups.)

FIG. 6

COMPLEX NUMBER TOKENIZATION USING A DISTRIBUTED LEDGER

CROSS-REFERENCE TO RELATED APPLICATIONS

This application is a divisional of U.S. patent application Ser. No. 17/702,251 entitled "Complex Number Digital Token Architecture," filed on Mar. 23, 2022, which claims priority to and the benefit of the filing date of (1) provisional U.S. Patent Application No. 63/256,498 entitled "Complex Number Digital Token Architecture," filed on Oct. 15, 2021, and (2) provisional U.S. Patent Application No. 63/262,741 entitled "Complex Number Digital Token Architecture," filed on Oct. 19, 2021, the entire contents of each of which are hereby expressly incorporated herein by reference.

TECHNICAL FIELD

The present disclosure relates generally to systems and methods to exchange digital tokens having complex number values, and more particularly to the use of distributed ledgers to record the transfer of and/or automatically exchange complex number value tokens.

BACKGROUND

Traditionally, monetary value has been represented solely by magnitude. For example, US fiat currency is denominated in dollars which are real numbers. Digital currencies have also followed this model. For example, tokens on the Ethereum network, such as Ether, are represented by real number values.

Furthermore, typical exchanges such as stock market exchanges, fiat currency exchanges, and cryptocurrency exchanges maintain order books to match buyers with sellers based on the magnitudes of the price a buyer is willing to pay (also referred to herein as "the bid price") and the price at which a seller is willing to sell (also referred to herein as the "ask price"). The buyers and sellers may also be ranked based on the time in which they enter the bid and ask prices. In some scenarios, high frequency traders monitoring the order books may gain unfair advantages over other traders who have a higher latency, before entering into or exiting a trade.

SUMMARY

Techniques, systems, apparatuses, components, devices, and methods are disclosed for a digital token having complex token values with at least two components, such as a magnitude and a phase, or a real and imaginary component. In some implementations, the digital token value may also have an angular frequency component (also referred to herein as a "frequency") or multiple frequency components for adjusting the phase of the digital token value and/or a coordinate system rotation for the digital token value over time. Transfer of the digital token is recorded in a distributed ledger (e.g., blockchain) maintained by validating network nodes.

The nodes receive transactions broadcasted to a distributed ledger network from client devices interacting with the distributed ledger. The transactions may indicate that a particular complex number value (e.g., 2−8i, or $5e^{i\pi}$) is being transferred from a first owner having a first address to a second owner having a second address.

Still further, distributed ledgers may be utilized to execute smart contracts, described in more detail below. For example, a complex value exchange smart contract may be deployed to the distributed ledger to determine when to match a buyer with a seller of the digital token. Unlike traditional exchanges which match buyers and sellers based on magnitude alone, the complex value exchange smart contract may match buyers and sellers based on the magnitudes of the bid and ask prices, the phase of the bid and ask prices, and/or some combination thereof. In some implementations, the complex value exchange smart contract may assign frequencies to each of the bid and ask prices or to either the bid or ask prices, so that the current phases of the bid and/or ask prices automatically change over time. The complex value exchange smart contract may assign the same frequency to each of the bid and/or ask prices so that high frequency traders (i.e., algorithms) cannot gain an unfair advantage over lower latency traders.

In other implementations, the complex value exchange smart contract may assign different frequencies to each bid and/or ask price based on the transaction fee that a user is willing to pay to the complex value exchange smart contract. In this manner, users paying higher transaction fees may be more likely to execute a trade at a particular bid or ask price due to the particular bid or ask price changing more frequently, thereby increasing the likelihood of finding a match over a particular time period.

The complex value exchange smart contract may set the rules for when to match a bid price with an ask price and how to order the bid prices and the ask prices in an order book. For example, bid prices having the same magnitude may be ordered according to their respective phases, where the lower phases are ordered above higher phases. For example, a first bid with a magnitude of 6 and a phase of 0 may be ranked or ordered above a second bid with the same magnitude of 6 but a phase of $\pi/2$ radians. When the complex value exchange smart contract identifies a match, the digital token value is exchanged from the selling party to the buying party, and the transfer is recorded in the distributed ledger.

In another example, a complex value smart contract may be deployed to the distributed ledger to determine the digital token value owned by each user or address. In some implementations, the complex value smart contract may add each of the real number components of the digital tokens owned by a particular user or address to generate an overall real number value owned by the particular user or address and may add each of the imaginary number components of the digital tokens owned by a particular user or address to generate an overall imaginary number value owned by the particular user or address. The complex value smart contract may also determine the magnitude of the digital tokens owned by a particular user or address as the square root of the sum of the squares of the overall real number value and the imaginary real number value, and the phase as the inverse tangent of the overall imaginary number value over the overall real number value. While the digital token values are referred to herein as having complex number values, the digital token values may also include split-complex number values. For a split-complex number value, the square of the imaginary component, i, is 1 instead of −1 for a complex number value. Also, the magnitude of a split-complex number value is the square root of the difference between the squares of the real number value and the imaginary number value instead of the sum.

Additionally, while the digital token values discussed herein are described using the base 10 system, the digital token values are base agnostic and can apply to any base. For example, the digital token values may be represented in base 2, base 3, base 5, quarter-imaginary, etc.

In other implementations, the complex value smart contract may multiply each of the complex digital token values owned by a particular user or address to generate an overall complex digital token value owned by the particular user or address. In yet other implementations, the complex value smart contract may add complex digital token values in some instances and multiply complex digital token values in other instances. For example, if the particular user or address initially obtains 6+7i digital tokens, the complex value smart contract may determine that the particular user or address has 6+7i digital tokens. Then if the user acquires 3+2i additional digital tokens, the complex value smart contract may multiply (6+7i)*(3+2i) and determine that the particular user or address has 4+33i digital tokens. If the user acquires an additional 4−33i digital tokens, the complex value smart contract may multiply (4+33i)*(4−33i) and determine that the particular user or address has 1105 digital tokens.

By utilizing distributed ledgers and in some scenarios, smart contracts to exchange complex token values, the complex token system maintains a trusted, secure, and immutable record of the transactions. The complex token system in conjunction with a distributed ledger allows for a new form of programmable money having multiple components (e.g., magnitude and phase components, real and imaginary components, frequency components, etc.). These additional components can be used to address several problems with current electronic trading and finance systems as well as current distributed ledger technologies.

In particular, token values for cryptocurrencies or other tokens recorded on a blockchain or other distributed ledger are publicly available for everyone to view. This results in privacy and security issues where distributed ledger addresses having large token values may become targets for attacks. By including multiple components and/or adjusting (i.e., rotating) the coordinate system for each digital token value, the complex token system obfuscates the real monetary value at each address protecting the privacy of the users. For example, unlike traditional systems where the exchange value of the digital tokens increases in proportion to the number of digital tokens, the exchange value of the complex digital tokens may increase in proportion to the real number component, in proportion to the magnitude, or in some other suitable manner. In this manner, it may be unclear to potential attackers which address has the digital tokens with the largest exchange value. For example, if digital tokens having smaller phases have more value than digital tokens having larger phases and overall complex digital token values are determined by multiplying individual complex digital token values at a particular distributed ledger address, users may try to acquire complex digital token values which are the complex conjugates of their current complex digital token values. Accordingly, the digital token value 7+5i, for example, may be more desirable for a user who has 7−5i digital tokens than other users who do not have the complex conjugate of that digital token value. As a result, each complex digital token value may have different monetary value to each user, making it more difficult for an attacker to identify the users with the most monetary value. This protects the privacy of the users and improves the security of the complex token system.

Moreover, when exchanging stocks, cryptocurrencies, fiat currencies, etc., traders typically list a price at which they are willing to buy or sell the asset and exchange the asset when another trader meets the requested price. By including a frequency component such that the current phase of each complex digital token value changes over time, the complex token system can pair buyers with sellers without the buyer or seller having to adjust their requested bid or ask price. In this manner, a larger number of orders may be filled over a short period of time. Furthermore, by assigning the same frequency to each of the bid and/or ask prices, the complex token system prevents high frequency traders from gaining unfair advantages from lower latencies.

Still further, by including multiple components for each digital token value, the complex token system includes additional information in each transaction. This may reduce the number of transactions in the network compared to alternative systems that provide a single number value in each transaction (e.g., a real number value), thereby increasing the efficiency of the system and reducing bandwidth requirements. This is particularly significant in a distributed ledger network where changes are propagated across each of the nodes in the network.

One example embodiment of the techniques of this disclosure is a method for recording an exchange of value in a distributed ledger. The method includes interacting with a distributed ledger maintained by a plurality of participants in a distributed ledger network. The distributed ledger includes a set of consensus rules. The method also includes generating a transaction indicating an exchange of value of a digital token, where the transaction is stored in the distributed ledger, and where the digital token value is a complex number value having at least two components, and transmitting the transaction to at least one other participant in a distributed ledger network of participants maintaining the distributed ledger, where the plurality of participants append data to the distributed ledger in response to determining that the data satisfies the set of consensus rules.

Another example embodiment of the techniques of this disclosure is a validating network node in a distributed ledger network. The validating network node includes a transceiver configured to exchange distributed ledger data with peer network nodes. The distributed ledger data includes digital token values exchanged between participants in the distributed ledger network, the digital token values being complex number values having at least two components. The validating network node also includes a storage media configured to store a copy of the distributed ledger, and one or more processors configured to apply a set of consensus rules to distributed ledger data received from the peer network nodes, and append distributed ledger data received from peer nodes to the copy of the distributed ledger if the distributed ledger data satisfies the consensus rules.

Yet another example embodiment of the techniques of this disclosure is a method for deploying a smart contract for managing exchanges of real and imaginary value using a distributed ledger maintained by a plurality of participants. The method includes generating a smart contract configured to receive requests to receive and transmit digital token values, where the digital token values are complex number values having at least two components, identify parties requesting to transmit and receive a same digital token value, and exchange the same digital token value between the identified parties. The method includes deploying the smart contract to an address stored on the distributed ledger maintained by the plurality of participants in a distributed ledger network.

BRIEF DESCRIPTION OF THE DRAWINGS

FIG. 5 illustrates an example order book for exchanging complex digital token values, where the complex digital token values are represented with real number and imaginary components;

FIG. 6 illustrates another example order book for exchanging complex digital token values, where the complex digital token values are represented with magnitude and phase components;

DETAILED DESCRIPTION

Figure 1:
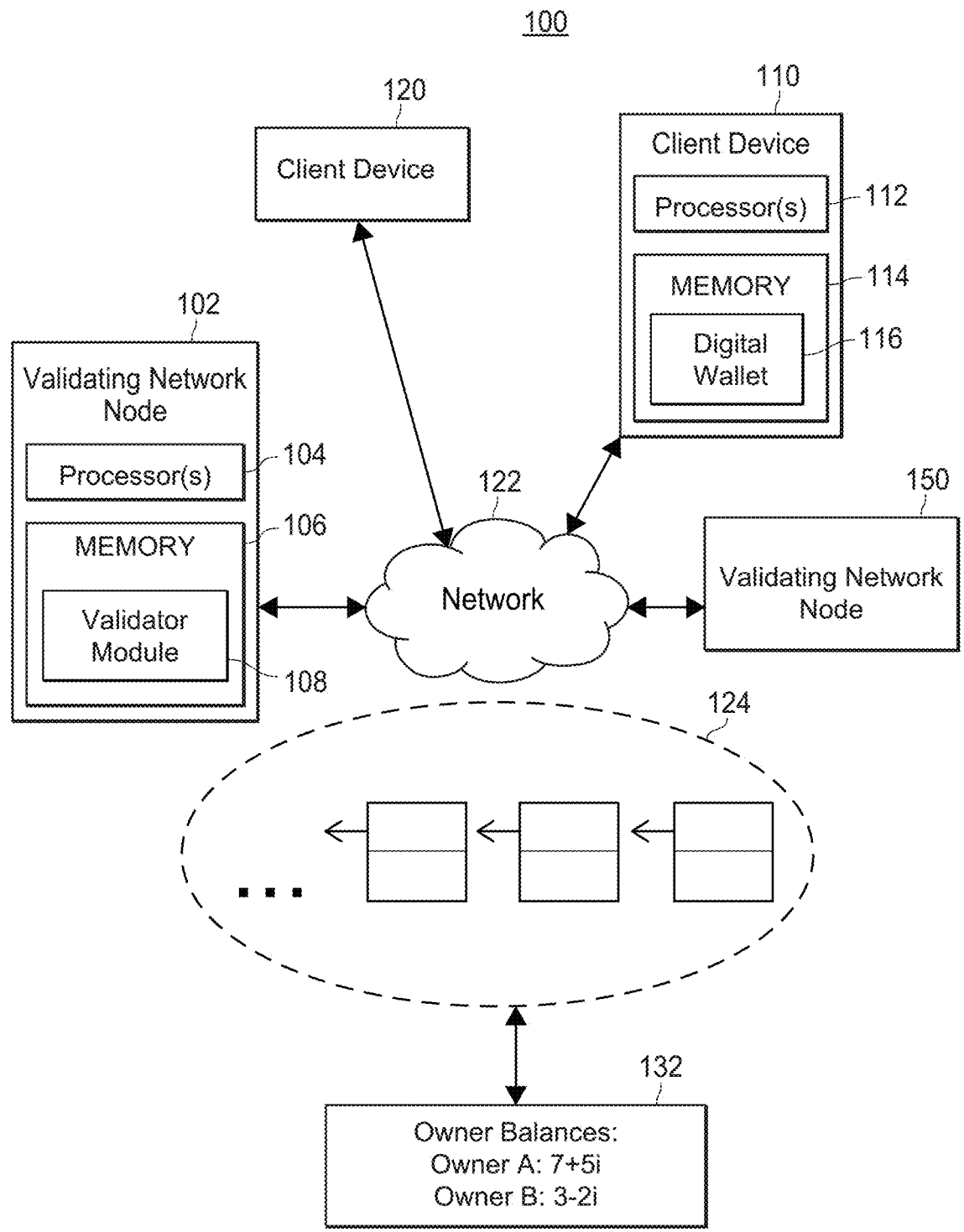
FIG. 1 illustrates a block diagram of a computer network and system on which a complex token system may operate in accordance with an example aspect of the present disclosure.

A distributed ledger is a storage mechanism for data, events, transactions, etc. that is maintained by several participants. More specifically, a distributed ledger is a way of achieving a distributed consensus on the validity or invalidity of information recorded in the distributed ledger. In other words, the distributed ledger provides a decentralized trust to participants and observers. As opposed to relying on a central authority, a distributed ledger is a decentralized database in which a transactional record of changes to the ledger is maintained and validated by each node of a peer-to-peer network. One type of distributed ledger, a blockchain, is comprised of groupings of transactions organized together into a "block," and ordered sequentially (thus the term "blockchain"). While the distributed ledgers discussed herein are referred to in the context of a blockchain, this is merely one example of a distributed ledger. Distributed ledgers may also include a tangle, a block lattice, or other directed acyclic graph (DAG), for example. In any event, nodes may join and leave the blockchain network over time and may obtain blocks from peer nodes that were propagated while the node was gone. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.). A consensus rule may also require that at least some of the digital token values include complex values having at least two components (e.g., a real number component and an imaginary component, a magnitude and phase, a frequency component, etc.), or may specify an equation, formula, or algorithm that operates upon such complex values, etc. In other implementations, the consensus rules do not indicate the types of values that may be included in transactions. Instead, a smart contract may specify an equation, formula, or algorithm that operates upon complex values, or the smart contract may be configured to mint complex digital token values, transfer the complex digital token values, and/or perform operations on the complex digital token values to aggregate or combine the complex digital token values at an address.

Additions to the blockchain that satisfy the consensus rules are propagated from nodes that have validated the addition to other nodes known to the validating node. If all of the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and the change is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

A smart contract is a computer protocol that enables the automatic execution and/or enforcement of an agreement between different parties. In particular, the smart contract may be computer code that is located at a particular address on the blockchain. In some cases the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds that are stored at their address. In some scenarios when this balance reaches zero the smart contract may no longer be operational.

The smart contract may include one or more trigger conditions, that, when satisfied, correspond to one or more actions. For some smart contracts, the action(s) performed may be determined based upon one or more decision conditions. In some instances, data streams may be routed to the smart contract so that the smart contract may detect that a trigger condition has occurred and/or analyze a decision condition.

Blockchains may be deployed in a public, decentralized, and permissionless manner, meaning that any party may view the distributed ledger, submit new information to be added to the ledger, or join the network as a validating node. Other blockchains are private (e.g., permissioned ledgers) that keep chain data private among a group of entities authorized to participate in the blockchain network. Other blockchain implementations may be both permissioned and permissionless whereby participants may need to be validated, but only the information that participants in the network wish to be public is made public.

In some implementations, a distributed ledger includes multiple blockchains such as a main blockchain and several side chains operating independently of the main blockchain. The side chains then interact with the main blockchain to provide some of the transaction data from the side chains to the main blockchain. In this manner, the side chains can be permissioned or private while the main blockchain is public or available to a larger number of entities than the side chains. Non-sensitive information from the side chains may be shared on the main blockchain. Also in some implementations, a distributed ledger includes multiple layers or separate blockchains executing in parallel that are maintained by the same validating nodes. Some of the transaction data from the blockchain for the first layer may be provided to the blockchain for the second layer or vice versa.

In one example, a distributed ledger in a complex token system may be maintained by validating nodes which transmit data to remote systems using one or more public and/or private networks, such as a private enterprise network, the Internet, a satellite, a cellular router, a backhaul Internet or other type backhaul connection. The validating nodes receive transactions broadcasted to the distributed ledger network by, for example, user devices. The nodes then validate the broadcasted transactions.

In another example, the validating nodes execute code contained in "smart contracts" and other devices act as "evidence oracles" which provide evidence related to market price, for example, to the blockchain. Oracles may be systems, devices, or entities that connect a deterministic system with a non-deterministic system or data source.

In the following description, for the purposes of explanation, specific details are set forth in order to provide a thorough understanding of various implementations and examples. Various implementations may be practiced without these specific details. The figures and description are not intended to be restrictive.

FIG. 1 illustrates various aspects of an example complex token system 100. The complex token system 100 may include validating network nodes 102, 150, and client devices 110, 120, which may be communicatively connected through a network 122 as described below. According to embodiments, the validating network nodes 102, 150 may be a combination of hardware and software components, also as described in more detail below with reference to FIG. 9. The validating network nodes 102, 150 may each include a memory 106, one or more processors 104 such as a microcontroller or a microprocessor, and other components not shown in FIG. 1 (e.g., a random-access memory (RAM), and/or an input/output (I/O) circuit), all of which may be interconnected via an address/data bus.

The memory 106 and/or RAM may store various applications for execution by the one or more processors 104. For example, a user interface application may provide a user interface to the validating network node 102, which user interface may, for example, allow the system administrator to configure, troubleshoot, and/or test various aspects of the node's operation.

The memory 106 may be tangible, non-transitory memory and may include any types of suitable memory modules, including RAM, read-only memory (ROM), flash memory, other types of persistent memory, etc. The memory 106 may store, for example, instructions executable on the processors 104 for a validator module 108.

The validator module 108 may validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may also require that at least some of the digital token values include complex values having at least two components (e.g., a real number component and an imaginary component, a magnitude and phase, a frequency component, etc.), or may specify an equation, formula, or algorithm that operates upon such complex values, etc. In other implementations, the consensus rules do not indicate the types of values that may be included in transactions. Instead, a smart contract may specify an equation, formula, or algorithm that operates upon complex values, or the smart contract may be configured to mint complex digital token values, transfer the complex digital token values, and/or perform operations on the complex digital token values to aggregate or combine the complex digital token values at an address. Users may interact with the smart contract(s) via a distributed application (DApp). Another consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

The validator module 108 may append distributed ledger data to the distributed ledger if the distributed ledger data satisfies the consensus rules by generating a new block of validated transactions to include in the distributed ledger 124 and/or by broadcasting a block of transactions to other network nodes. Otherwise, the validator module 108 disregards any distributed ledger data that does not satisfy the consensus rules, and the distributed ledger data is not propagated to other network nodes. For example, as shown in FIG. 1, the distributed ledger 124 indicates the token balances 132 of users or owners at respective distributed ledger addresses. More specifically, the distributed ledger 124 may indicate that Owner A has a token balance of 7+5i and Owner B has a token balance of 3−2i. The validating network nodes 102, 150 are discussed in more detail below.

The client devices 110, 120 may include, by way of example, a tablet computer, a cell phone, a personal digital assistant (PDA), a mobile device smart-phone also referred to herein as a "mobile device," a laptop computer, a desktop computer, a portable media player, a wearable computing device, smart glasses, smart watches, phablets, other smart devices, devices configured for wired or wireless RF (Radio Frequency) or optical communication, etc. Of course, any network-enabled device appropriately configured may interact with the complex token system 100. The client device 110 need not necessarily communicate with the network 122 via a wired connection. In some instances, the client device 110 may communicate with the network 122 via wireless signals and, in some instances, may communicate with the network 122 via an intervening wireless or wired device, which may be a wireless router, a wireless repeater, a base transceiver station of a mobile telephony provider, an optical communications device, etc.

The client device 110 may include a memory 114, one or more processors 112 such as a microcontroller or a microprocessor, and other components not shown in FIG. 1 (e.g., a display, a communication unit, a user-input device, a RAM, and/or an I/O circuit), all of which may be interconnected via an address/data bus. The memory 114 may include an operating system, a data storage, a plurality of software applications, and/or a plurality of software routines. The operating system, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage may include data such as user profiles, application data for the plurality of applications, routine data for the plurality of routines, and/or other data necessary to interact with the validating network nodes 102, 150 through the digital network 122. In some embodiments, the one or more processors 112 may also include, or otherwise be communicatively connected to, other data storage mechanisms (e.g., one or more hard disk drives, optical storage drives, solid state storage devices, etc.) that reside within the client device 110.

The communication unit may communicate with the validating network nodes 102, 150 via any suitable wireless communication protocol network, such as a wireless telephony network (e.g., GSM, CDMA, LTE, etc.), a Wi-Fi network (802.11 standards), a WiMAX network, a Bluetooth network, etc.

The user-input device may include a "soft" keyboard that is displayed on the display of the client device 110, an external hardware keyboard communicating via a wired or a wireless connection (e.g., a Bluetooth keyboard), an external mouse, or any other suitable user-input device.

The one or more processors 112 may be adapted and configured to execute any one or more of the plurality of software applications and/or any one or more of the plurality of software routines residing in the memory, in addition to other software applications. One of the plurality of applications may be a client application that may be implemented as a series of machine-readable instructions for performing the various tasks associated with receiving information at, displaying information on, and/or transmitting information from the client device 110.

One of the plurality of applications may be a native application and/or web browser, such as Apple's Safari®, Google Chrome™, Microsoft Internet Explorer®, and Mozilla Firefox® that may be implemented as a series of machine-readable instructions for receiving, interpreting, and/or displaying web page information while also receiving inputs from the user. Another application of the plurality of applications may include an embedded web browser that may be implemented as a series of machine-readable instructions for receiving, interpreting, and/or displaying web page information. One of the plurality of routines may include a complex digital token value send routine which receives an amount of the digital token that the user wants to send, and an address to which to send the amount of the digital token, and then sends the complex digital token value to the address by generating a transaction including the complex digital token value and the address, and broadcasting the transaction to, e.g., nodes 102, 150 of the distributed ledger network.

Preferably, a user may launch a digital wallet 116 from a client device 110 to send and receive transactions including complex digital token values. For example, the digital wallet 116 may interact with the distributed ledger 124. The digital wallet 116 may obtain an amount of the digital token that the user wants to send, and an address in which to send to the amount of the digital token. The digital wallet 116 may then generate a transaction including the complex digital token value and the address, and broadcast the transaction to nodes 102, 150 of the distributed ledger network that maintain the distributed ledger 124. To receive a complex digital token value, the digital wallet 116 may include user controls for presenting a distributed ledger address associated with the digital wallet 116. A user may then transmit an indication of the distributed ledger address (e.g., a QR code including the address, a set of alphanumeric characters indicating the address, etc.) to another user who is sending the complex digital token value. The digital wallet 116 may also interact with smart contracts to exchange particular complex digital token values.

It will be appreciated that although only two client devices 110, 120 and two validating network nodes 102, 150 are depicted in FIG. 1, any suitable number of client devices 110, 120 and any suitable number of validating network nodes 102, 150 may be included in the complex token system. In some instances, client device 110, 120 may also operate as validating network nodes 102, 150 and/or validating network nodes 102, 150 may also operate as client devices 110, 120.

The client devices 110, 120 and validating network nodes 102, 150 may communicate with each other via the network 122. The digital network 122 may be a proprietary network, a secure public Internet, a virtual private network and/or some other type of network, such as dedicated access lines, plain ordinary telephone lines, satellite links, a wireless telephony network, combinations of these, etc. Where the digital network 122 comprises the Internet, data communication may take place over the digital network 122 via an Internet communication protocol.

Figure 2:
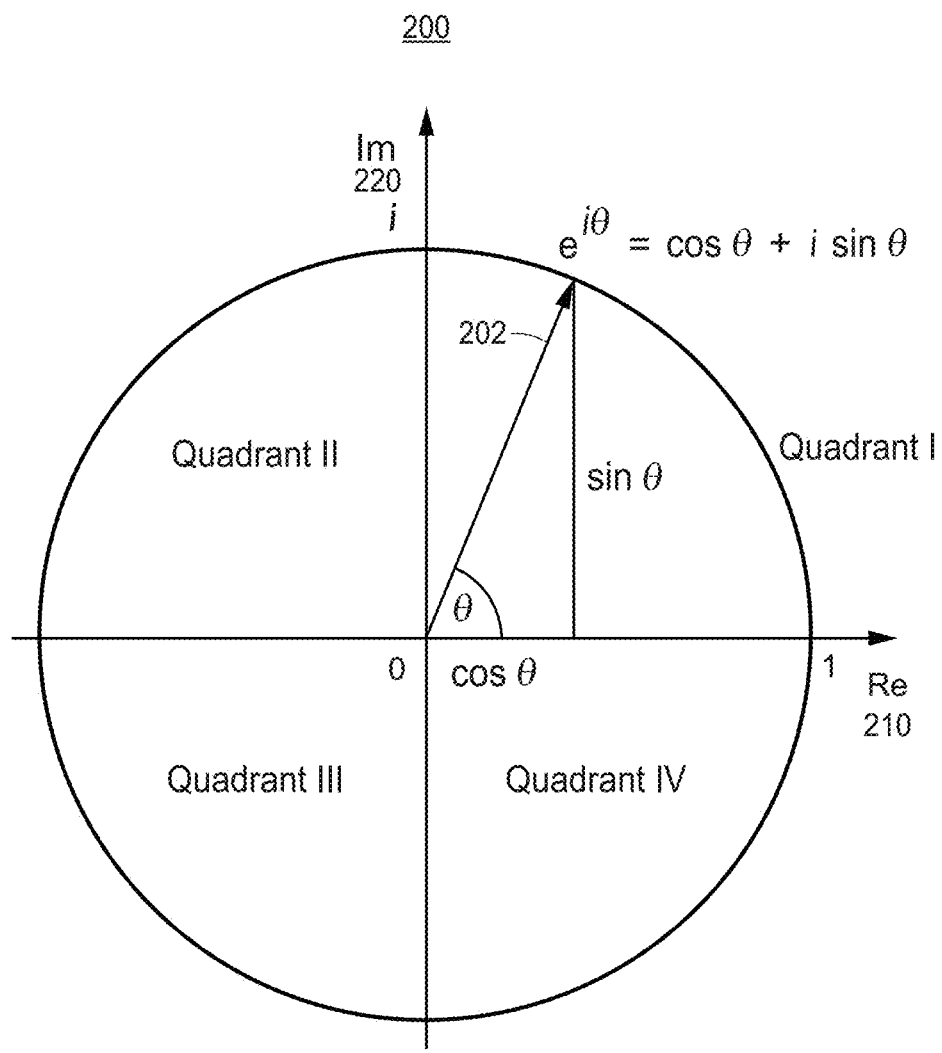
FIG. 2 is an example complex token value on the unit circle having a real number component and an imaginary component.

FIG. 2 illustrates an example representation 200 of a complex digital token value 202 within a unit circle in a complex number plane. The complex number plane includes a real number axis 210 and an imaginary number axis 220. When the complex digital token value 202 is represented as a magnitude, M, and phase, $\theta$, the real number component may be M·cos($\theta$) and the imaginary number component may be M·sin($\theta$). The complex digital token value 202 may then be represented in Cartesian coordinates as M (cos($\theta$)+i sin($\theta$)). In other implementations, the complex digital token value 202 may be represented in the exponential format as M $e^{i\theta}$. On a unit circle, the magnitude, M, may be normalized to 1 and the complex digital token value 202 may be represented as cos($\theta$)+i sin($\theta$) or $e^{i\theta}$. The complex digital token value 202 may include a positive or negative real number component and a positive or negative imaginary component, such that the complex digital token value 202 can exist in any of the four quadrants of the complex number plane.

Additionally, the complex digital token value 202 may have a frequency component, $\omega$, such that the complex digital token value 202 changes over time. In this manner, it may be even more difficult for a potential attacker to determine the exchange value of the digital tokens at a particular address because the complex digital token value 202 is constantly changing. Moreover, the changing values make it more difficult for high frequency traders to analyze order books and quickly place orders that will fill right away. The frequency $\omega$ may be expressed as a change in angular rotation over time, (e.g., radians per second). If the frequency is $2\pi$ radians per second, then the complex digital token value 202 performs one full rotation on the unit circle every second. Accordingly, the complex digital token value 202 rotates at a frequency of 1 Hz.

Figures 3A, 3B:
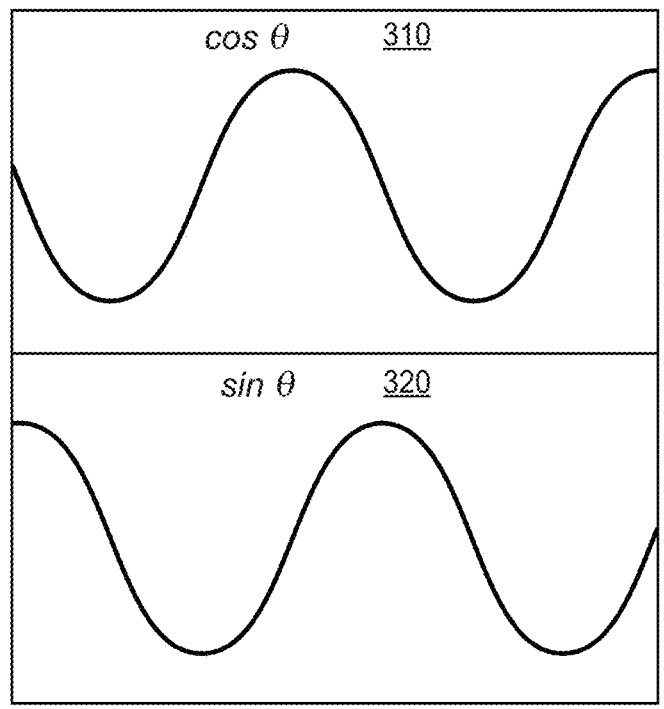
FIG. 3A is an example graph of a complex token value changing over time in accordance with a particular frequency and phase shift (e.g., $\pi/2$)
FIG. 3B is an example table of the real and imaginary components of a complex token value as they change over time in accordance with the particular frequency and phase shift (e.g., $\pi/2$)

FIG. 3A illustrates the real 310 and imaginary components 320 of a complex digital token value 202 as it changes over time with a frequency, $\omega$. For example, the real component 310 may be represented as cos($\theta$) where $\theta$ is the sum of an initial phase and the product of the frequency, $\omega$, and a current time value, t. The imaginary component 320 may be represented as sin($\theta$) where $\theta$ is the sum of the initial phase and $\omega t$. The frequency may be $2\pi$ radians per second, such that each second the complex digital token value 202 returns to its original "normalized" value.

FIG. 3B illustrates an example table 350 indicating the real, R, and imaginary, J, component values of the complex digital token value 202 at different points in time. The initial phase of the complex digital token value 202 is $\pi/2$, the magnitude is 1, and the frequency is $2\pi$ radians per second. At 0 seconds, the real component value is cos($2\pi \cdot 0 + \pi/2$) or 0. The imaginary component value is sin($2\pi \cdot 0 + w/2$) or 1. At 0.25 seconds, the real component value is cos($2\pi/4 + \pi/2$) or −1. The imaginary component value is sin($2\pi/4 + \pi/2$) or 0. At 0.5 seconds, the real component value is cos($2\pi/2 + \pi/2$) or 0. The imaginary component value is sin($2\pi/2 + \pi/2$) or −1. At 0.75 seconds, the real component value is cos($3\pi/2 + w/2$) or 1. The imaginary component value is sin($3\pi/2 + \pi/2$) or 0. At 0.75 seconds, the real and imaginary components return to their original values of 0 and 1, respectively.

In some implementations, in addition to the complex digital token 202 rotating at a particular frequency $\omega$, the coordinate system may also rotate at a particular frequency $\psi$. For example, the complex digital token 202 may rotate in the counterclockwise direction, and the coordinate system may rotate in the clockwise direction. If the first frequency component, $\omega$, for the complex digital token 202 is the same as the second frequency, $\psi$, at which the coordinate system rotates, then the complex digital token value 202 may rotate twice as fast, $2\omega$, relative to the position of the coordinate system. Accordingly, the complex digital token value 202 at a particular time may be determined based on the combination of the first and second frequency components, M [cos($\omega t + \psi t$)+i sin($\omega t + \psi t$)].

Figure 4:
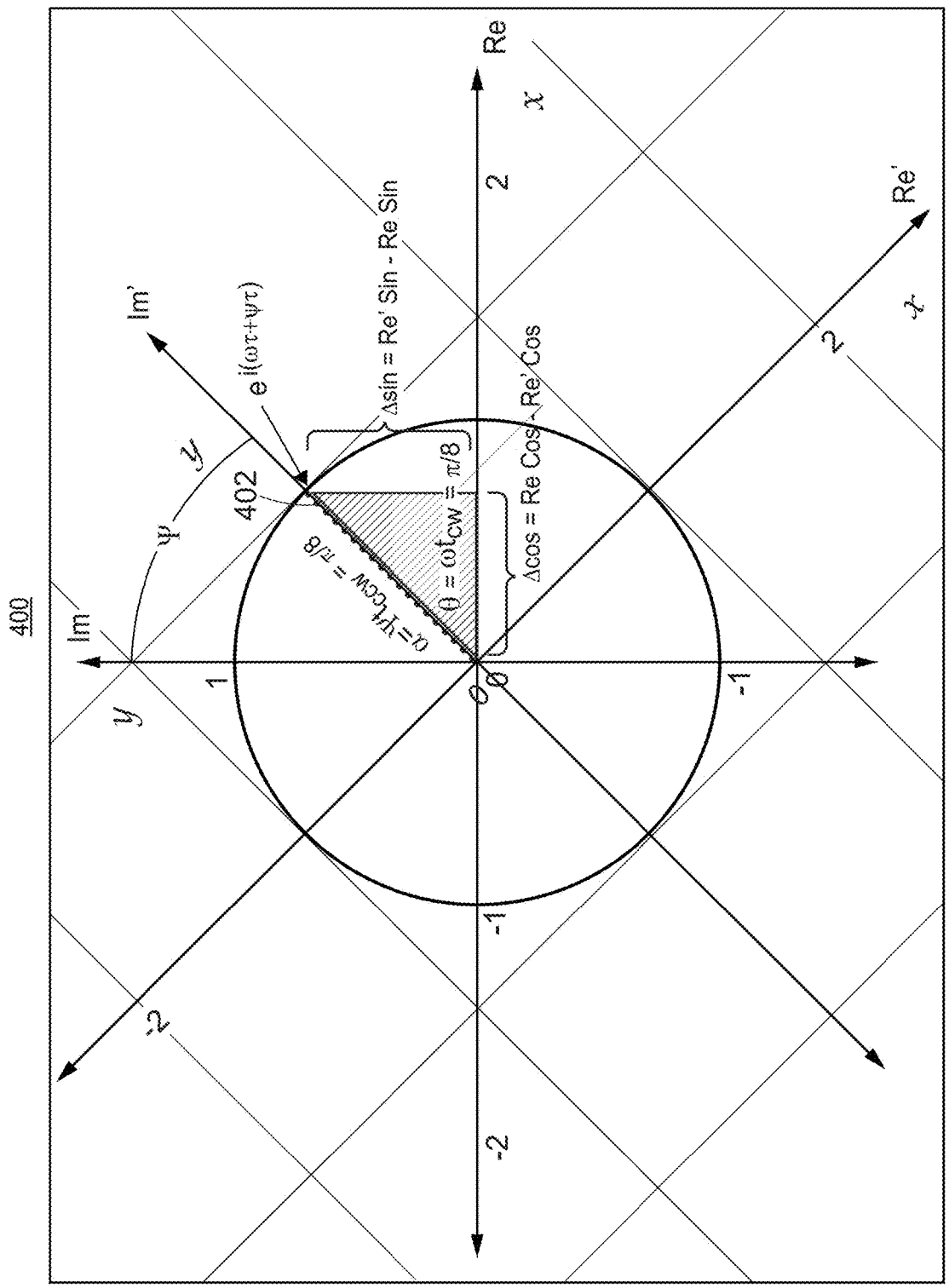
FIG. 4 is an example complex token value on the unit circle having a real number component, an imaginary component, and two frequency components ($\omega$, $\psi$), where the second frequency component ($\psi$) is based on a rotating coordinate system.

FIG. 4 illustrates an example representation 400 of a complex token value 402 within a unit circle in a complex number plane having a real number component, an imaginary component, and two frequency components ($\omega$, y), where the first frequency component, $\omega$, indicates the angular rate at which the complex token value 402 rotates and the second frequency component, v, indicates the angular rate at which the coordinate system rotates. For example, the first frequency component, $\omega$, may be $\pi/8$ radians per second, and the second frequency component, $\omega$, may be $-\pi/8$ radians per second. After one second, the complex token value 402 may change by $\pi/4$ radians relative to the coordinate system.

FIG. 5 illustrates an example order book 500 for exchanging the digital token. In the example order book 500, the digital token values include real and imaginary components. The example order book 500 may be maintained by a smart contract that receives requests to transmit and receive digital token values. The smart contract is described in more detail below.

In one example, users may request to exchange the complex digital token for Bitcoin or any other suitable cryptocurrency. When requesting to purchase Bitcoin, users may enter a maximum amount of the digital token per Bitcoin which they are willing to pay to buy Bitcoin (e.g., 2.72+4.2i), i.e., the bid price. When requesting to sell Bitcoin, users may enter a minimum amount of the digital token per Bitcoin in which they are willing to receive when selling their Bitcoin (e.g., 3+4i), i.e., the ask price. The order book 500 ranks the buy orders and the sell orders. Then the smart contract identifies when there is a match between a buy order and a sell order, and exchanges Bitcoin from the selling party with the digital token value from the buying party. The smart contract may identify a match in several ways.

In one implementation, when the magnitude of the complex value in the bid price matches the magnitude of the complex value in the ask price, the smart contract identifies a match. In another implementation, the smart contract identifies a match when the magnitudes and phases of the bid and ask prices are the same. In yet another implementation, the smart contract may change the phase of the ask price at periodic time intervals (e.g., every 0.25 seconds, every millisecond, every second, etc.). The smart contract may assign frequency values to the ask prices and adjust the phases of the ask prices as a function of the frequency values and the current time without adjusting the phases of the bid prices. Then the smart contract identifies a match when the magnitudes and current phases of the bid and ask prices are the same at a particular time interval. However, the seller may only receive the initial digital token value from the buy order having an initial phase.

For example, at time $t_0$, a first user or party requests to buy Bitcoin for a bid price of $5e^{i3\pi/2}$ per Bitcoin. In this example, the first user requests to buy 1 Bitcoin, but the first user may request to purchase any suitable amount of Bitcoin. Also at time $t_0$, a second user or party requests to sell Bitcoin for an ask price of $5e^{i0}$ per Bitcoin. The frequency value for the ask price may be set to $2\pi$ radians per second so that the ask price can be represented as $5e^{i(0+\omega t)}$, where $\omega$ is $2\pi$ radians per second. Then at time $t_1 = 0.25$ seconds, the ask price from the second user may be $5e^{i\pi/2}$. At time $t_2 = 0.5$ seconds, the ask price from the second user may be $5e^{i\pi}$, and at time $t_3 = 0.75$ seconds, the ask price from the second user may be $5e^{i3\pi/2}$ matching the bid price from the first user. At time $t_3$, the smart contract identifies a match between the bid price and the ask price and transfers 1 Bitcoin to the first user and $5e^{i3\pi/2}$ digital tokens to the second user.

Alternatively, the smart contract may assign frequency values to the bid prices and adjust the phases of the bid prices as a function of the frequency values and the current time without adjusting the phases of the ask prices. Then the smart contract identifies a match when the magnitudes and phases of the bid and ask prices are the same at a particular time interval. In other implementations, the smart contract may also assign frequency values to both the bid prices and the ask prices and adjust the phases of the bid prices and the ask prices as a function of the frequency values and the current time, where the bid price frequency values are different from the ask price frequency values.

Also in some implementations, the smart contract may assign a frequency value to a bid price or an ask price based on a transaction fee paid by a user submitting the bid price or the ask price. For example, the smart contract may increase the frequency in proportion to the transaction fee. In other implementations, the smart contract may assign the same frequency value for each bid price, the same frequency value for each ask price, or the same frequency value for each bid price and ask price so that none of the users gain an advantage over each other when entering trades.

As shown in the order book 500, for bid prices, values having larger magnitudes are ranked above values having smaller magnitudes. Additionally, values having the same magnitude and a smaller phase are ranked above values having a larger phase. This is the opposite for ask prices where values having smaller magnitudes are ranked above values having larger magnitudes, and values having the same magnitude and a larger phase are ranked above values having a smaller phase. In this example, values with the largest magnitudes and the smallest phases are the most desirable. However, this is just one example implementation. The smart contract can rank bid prices and ask prices in the order book 500 in any suitable manner based on the respective magnitudes, phases, or any suitable combination thereof of the bid prices and ask prices.

FIG. 6 illustrates another example order book 600 for exchanging the complex digital token, where the digital token values include magnitudes and phases. As with the order book 600, for bid prices, values having larger magnitudes are ranked above values having smaller magnitudes, and values having the same magnitude and a smaller phase are ranked above values having a larger phase.

Figure 7:
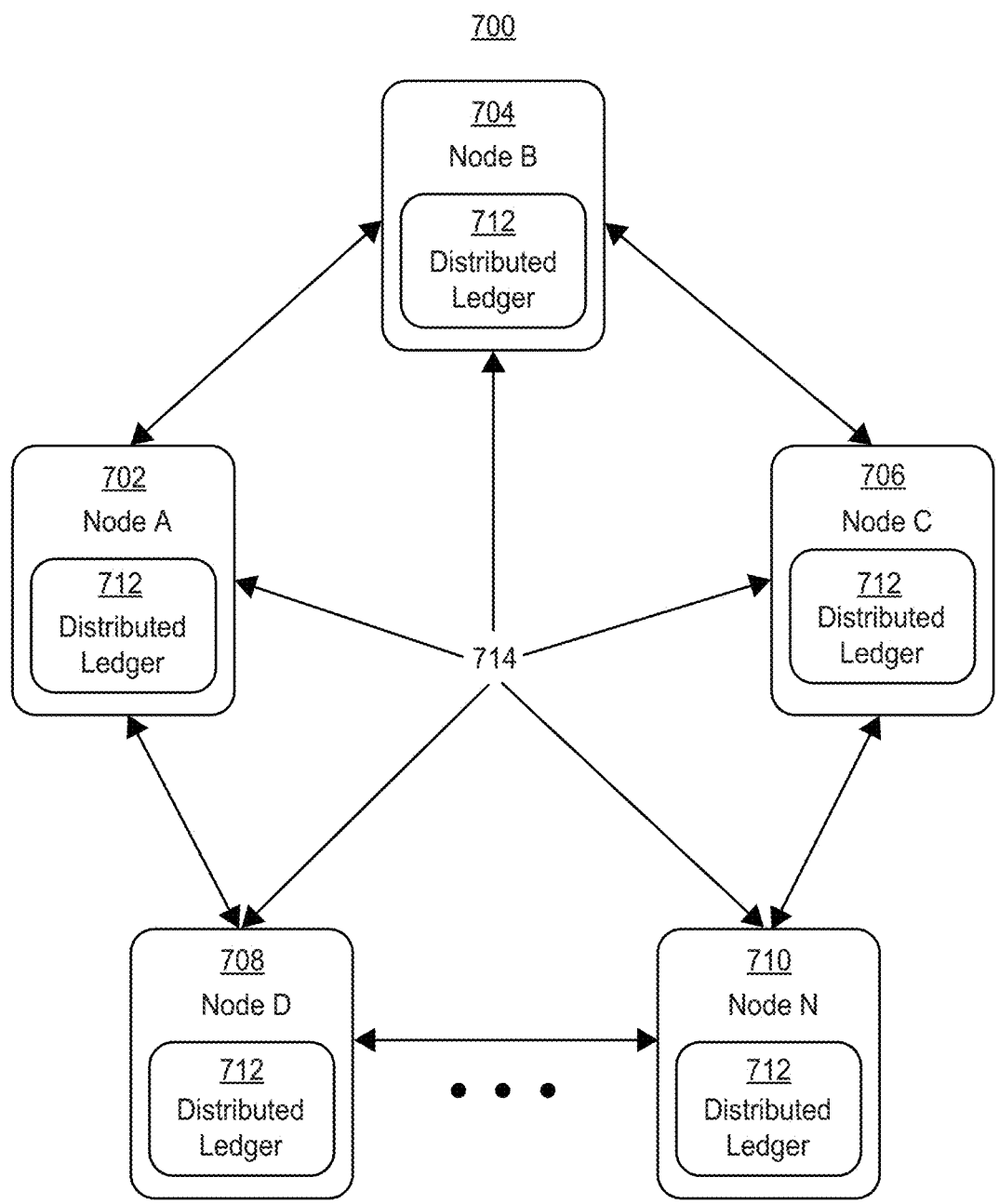
FIG. 7 is an exemplary distributed ledger system for recording transactions and executing smart contracts in a complex token system.

As mentioned above, digital token transfers are recorded in a distributed ledger. FIG. 7 depicts an exemplary distributed ledger system 700 for recording transactions and executing smart contracts in a complex token system 100. The system 700 includes a distributed ledger 712 (e.g., having one or more distributed ledger layers) and a plurality of nodes 702, 704, 706, 708, and 710 (e.g., each similar to node 102 or 150 of FIG. 1). Each node maintains a copy of the distributed ledger 712. As changes are made to the distributed ledger 712, each node receives the change via the network 714 and updates its respective copy of the distributed ledger 712. A consensus mechanism may be used by the nodes 702-710 in the distributed ledger system 700 to decide whether it is appropriate to make received changes to the distributed ledger 712 or to a particular layer of the distributed ledger 712.

Each node in the system therefore has its own copy of the distributed ledger 712, which is identical to every other copy of the distributed ledger 712 stored by the other nodes. The distributed ledger system 700 may be more robust than a central authority database system because of the distributed ledger's decentralized nature. As such, there is no single point of failure on the distributed ledger system 700 as there would be in a centralized system.

Figure 8:
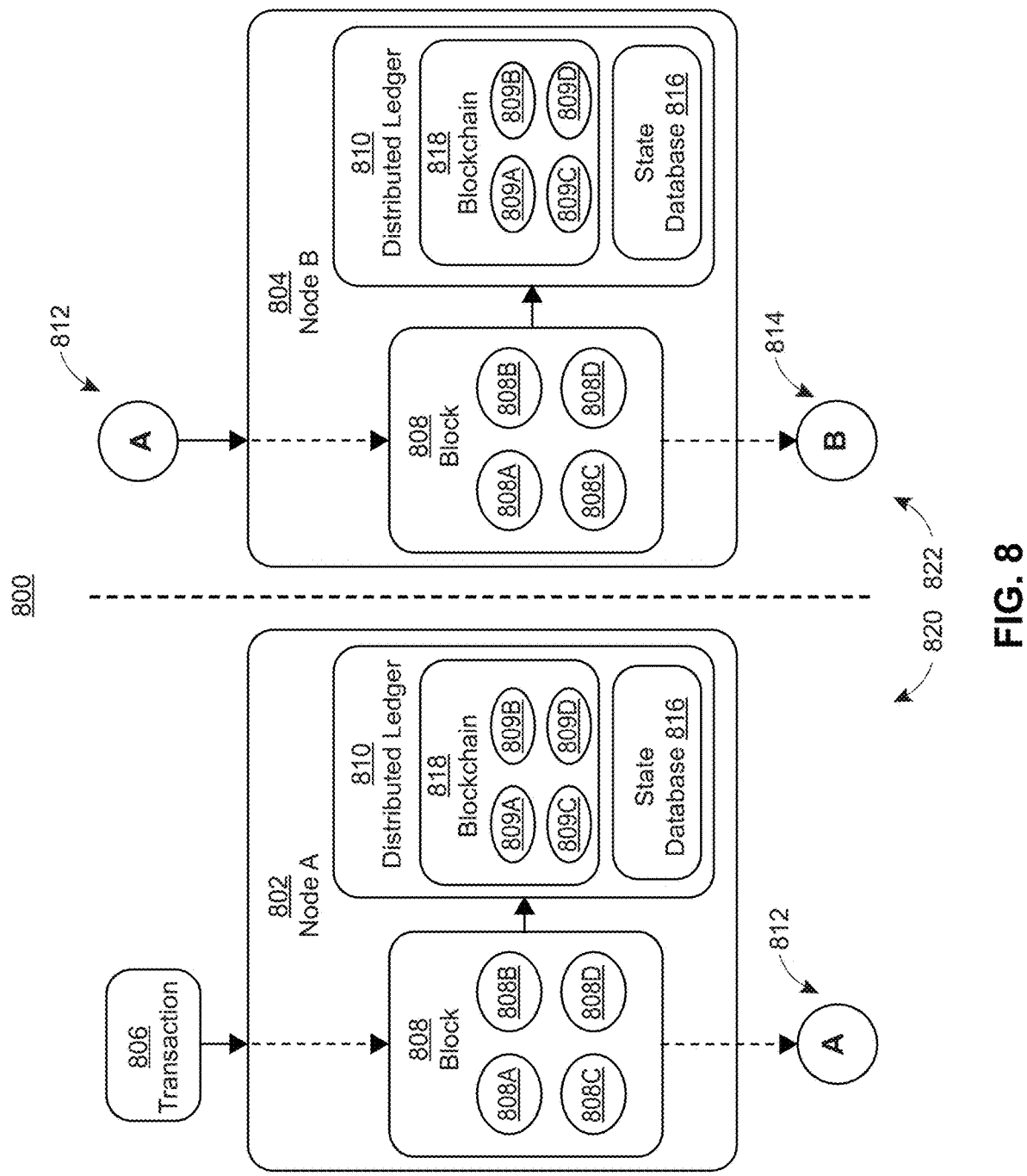
FIG. 8 illustrates exemplary validating network nodes and an exemplary transaction flow on a distributed ledger network in complex token system.

FIG. 8 depicts exemplary validating network nodes and an exemplary transaction flow 800 on a distributed ledger network for resolving transactions. FIG. 8 includes two time frames 820 and 822 represented by the left and right sides of the dotted line, respectively, Node A 802 (e.g., node 102) and Node B 804 (e.g., node 150), a set of transactions 808A-808D, a set of blocks of transactions 809A-809D, a distributed ledger 810, and a blockchain 818.

The block propagation flow 800 may begin with Node A 802 receiving transaction 806 at time 820. When Node A 802 confirms that transaction 806 is valid, Node A 802 may add the transaction to a newly generated block 808. As part of adding the transaction 806 to block 808, Node A 802 may solve a cryptographic puzzle and include the solution in the newly generated block 808 as proof of the work done to generate the block 808. Alternatively, a proof of stake algorithm may be used to generate the block 808, whereby Node A 802 "stakes" an amount of a digital token used on the network, however, the network itself determines the node that will mint the new block. In another implementation, a proof of authority (PoA) algorithm may be used to generate the block 808, where transactions and blocks are validated by approved accounts, known as validators which run software allowing them to record transactions in the distributed ledger.

In other embodiments, the transaction 806 may be added to a pool of transactions until a sufficient number of transactions in the pool exist to form a block or distributed ledger entry. Node A 802 may transmit the newly created distributed ledger entry 808 to the network at time 812. Before or after propagating the distributed ledger entry 808, Node A 802 may add the distributed ledger entry 808 to its copy of the distributed ledger 818.

While proof of work, proof of stake, and proof of authority are described herein as consensus algorithms for selecting a node to mint a new block, these are merely a few example consensus algorithms and are not intended to be limiting. Additional consensus algorithms may be utilized, such as delegated proof of stake where nodes elect a subset of nodes referred to as delegates to perform validation, and the delegates take turns minting new blocks. Consensus algorithms may also include proof of weight, Byzantine fault tolerance, tangle consensus algorithms, block lattice consensus algorithms, etc. Additionally, quorum slices may be selected where a quorum is a set of nodes that participate in the consensus protocol and a quorum slice is its subset that helps a node in its agreement process. Individual trust decisions may be made by participants in the distributed ledger network to construct a quorum slice. Still further, security circles may be identified which are closed groups of network participants who together can form a quorum to reach a consensus on a transaction and to make further trust decisions.

In any event, the transactions 809A-809D may include updates to a state database 816. The state database 816 may contain current values of variables created by smart contracts deployed on the distributed ledger 818. Validated distributed ledger entries, such as distributed ledger entry 808, may include transactions effecting state variables in state database 816. At time 822, Node B 804 may receive the newly created distributed ledger entry 808 via the network at 812. Node B 804 may verify that the distributed ledger entry 808 is valid by checking the solution to the cryptographic puzzle provided in the distributed ledger entry 808. If the solution is accurate, then Node B 804 may add the distributed ledger entry 808 to its distributed ledger 818 and make any updates to the state database 816 as rejected by the transactions in distributed ledger entry 808. Node B 804 may then transmit the distributed ledger entry 808 to the rest of the network at time 814.

Figure 9:
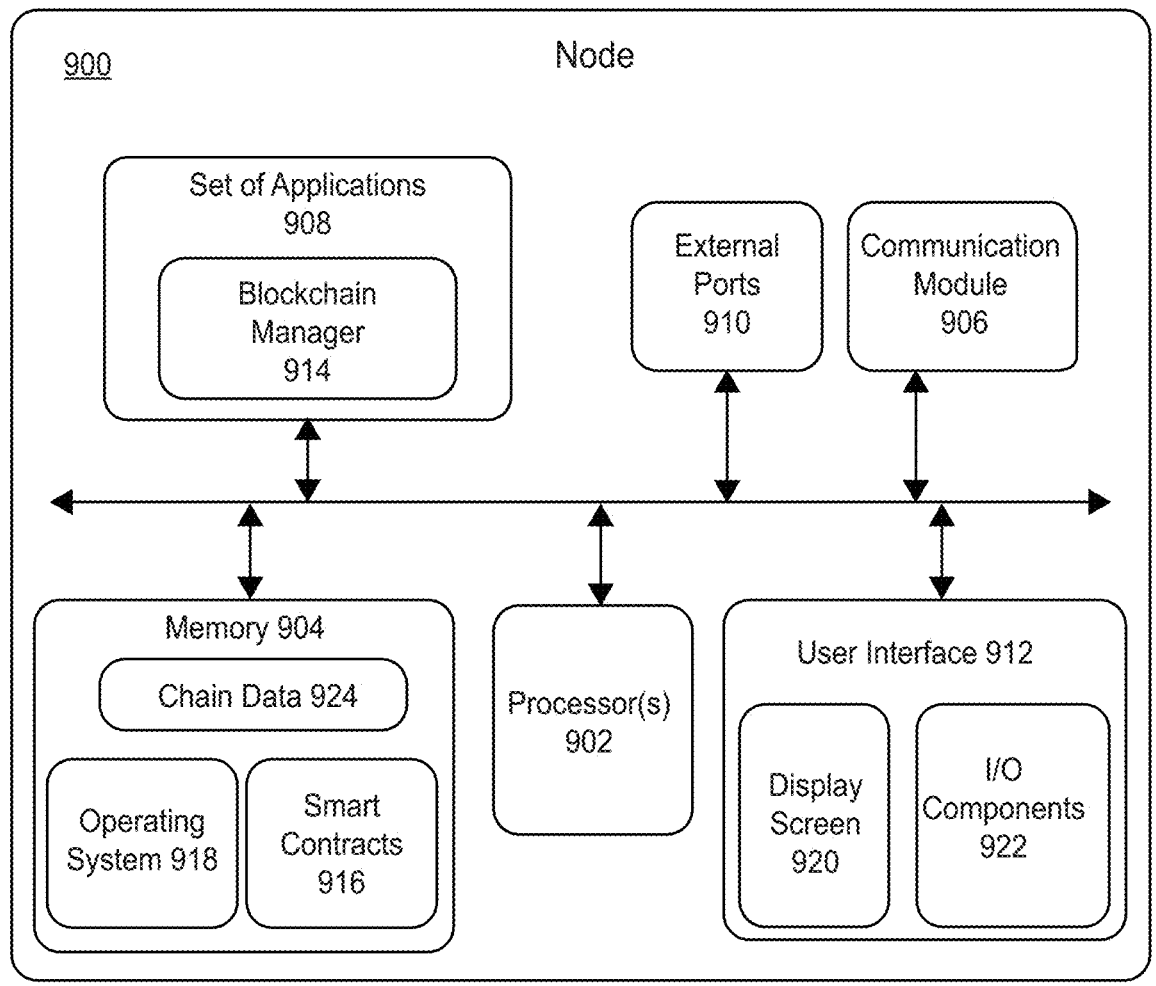
FIG. 9 illustrates exemplary components of a network node on a distributed ledger network in a complex token system.

FIG. 9 depicts exemplary components of a validating network node 900 on a distributed ledger network for recording transactions and executing smart contracts in a complex token system. The validating network node 900 may be similar to the validating network nodes 102, 150 described above with reference to FIG. 1. Node 900 may include at least one processor 902, memory 904, a communication module 906 such as a transceiver, a set of applications 908, external ports 910, a blockchain manager 914, smart contracts 916, and an operating system 918. In some embodiments, the node 900 may generate a new block of transactions, or may broadcast transactions to other network nodes via the transceiver 906 by using the blockchain manager 914. Similarly, the node 900 may use the blockchain manager 914 in conjunction with the smart contracts 916 stored in the memory 904 to execute the functionality disclosed herein. The memory 904 may further include chain data 924 including, for example, a state database of the blockchain for storing states of smart contracts deployed thereon.

In other embodiments, the smart contracts 916 operate independent of the blockchain manager 914 or other applications. In some embodiments, the node 900 does not have a blockchain manager 914, or smart contracts 916 stored at the node. In some embodiments, the node 900 may have additional or fewer components than described.

Figure 10:
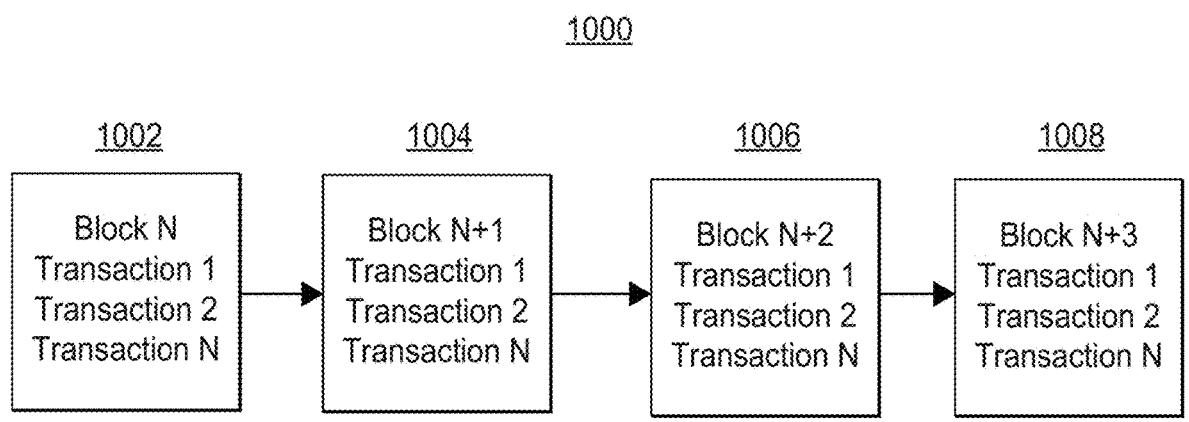
FIG. 10 illustrates an example blockchain having blocks of transactions.

FIG. 10 depicts an exemplary distributed ledger 1000 similar to the distributed ledger 124 as shown in FIG. 1. The example distributed ledger 1000 includes a blockchain having blocks 1002-1008 of transactions. In some embodiments, the blockchain 1000 includes several blocks 1002-1008 connected together to form a chain of blocks 1002-1008 of transactions. To cryptographically link blocks and transactions together, each block in the blockchain 1000 organizes its transactions into a Merkle Tree. In a Merkle Tree each transaction is hashed according to a cryptographic hashing algorithm (e.g., SHA-256) and the resulting output hash is then combined with the hash of another transaction. Then the combined result is also hashed according to the cryptographic hashing algorithm. This output is then combined with the hash of two other transactions and this process is repeated until all of the transactions in the block are combined and hashed to generate a Merkle root that is used in the header for a block 1002-1008. If any single transaction in the block is tampered with, a different Merkle root would be generated since the Merkle root is a combination of the hashes of all of the transactions in the block.

In other words, the transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the node at the top of the tree or Merkle root, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

To verify that a block is valid, a node may compare the Merkle root of the block to the Merkle root for the same block included in other nodes' copies of the blockchain. Thus, the Merkle root can be used as proof of the transactions included in the block and as proof that the contents of the block have not been tampered with if the Merkle root is the same in each node's copy of the block.

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. Only a cryptographic hash of the data may be included in the blockchain 1000, such that the data may be verified using the blockchain even if it is obtained by a party off-chain.

Validating network nodes may verify that the signed transaction or signed message was signed by the private cryptographic key corresponding to the published public cryptographic key owned by the user generating the transaction. In at least one implementation, a valid proof-of-identity may be applied as a consensus rule by the blockchain network. As such, any transaction attempting to exchange a complex digital token value or interact with a smart contract without a cryptographic proof-of-identity matching an identity authorized to exchange a complex digital token value or interact with a smart contract is rejected by the network as non-compliant with the consensus rule. Each owner may be assigned a public key/private key pair which is identified in the blockchain network as corresponding to the owner. If the validating network nodes receive a transaction that is not from an authorized owner, the validating network nodes reject the transaction.

For example, if the owner of a particular address corresponding to a public cryptographic key submits a transaction to transfer 9–1i digital tokens to another owner at another address, the transaction must include a cryptographic proof-of-identity indicating that the owner is in possession of the private cryptographic key corresponding to the public cryptographic key for the particular address. This proves that the owner is in possession of the digital tokens at the particular address and is able to transfer the digital tokens from the particular address.

In some implementations, the blockchain 1000 is a public blockchain meaning that any party may view the distributed ledger, submit new information to be added to the ledger, or join the network as a validating node. The distributed ledger may also include side chains which are private or permissioned blockchains that keep chain data private among a group of entities authorized to participate in the side blockchain network. In other embodiments, the main blockchain 1000 is also a permissioned blockchain but the main blockchain 1000 has a larger number of entities authorized to participate in the blockchain network than the side chains.

In addition to protecting privacy via side chains, in some embodiments, privacy may be preserved on the main blockchain 1000. For example, the transactions in the blockchain 1000 may obfuscate the identities of the parties to the transaction and the transaction amounts through various encryption techniques.

Figure 11:
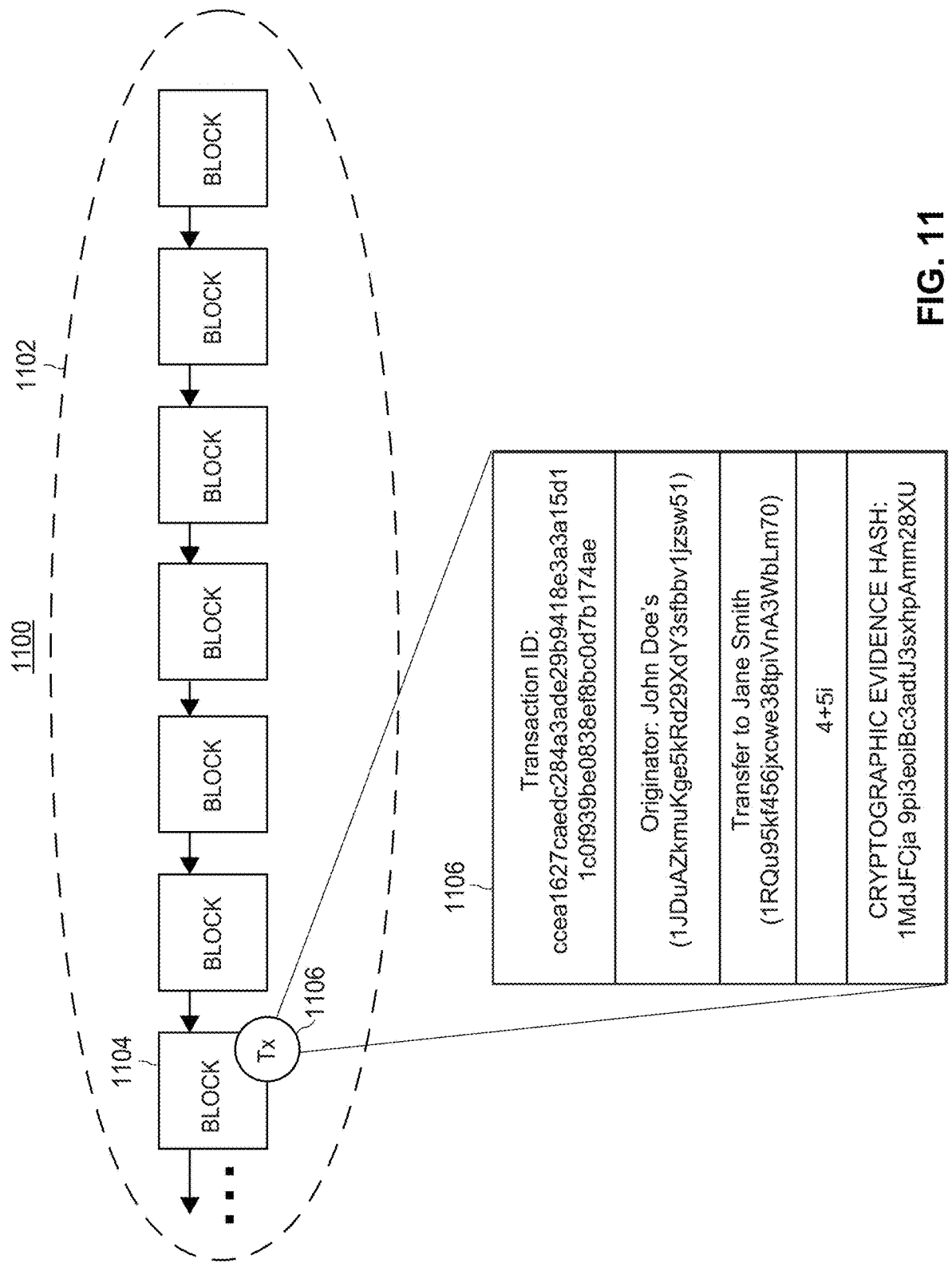
FIG. 11 illustrates an example transaction recording a transfer of a complex digital token value from a first address/user to a second address/user.

FIG. 11 illustrates an exemplary transaction 1106 representing the transfer of a complex digital token value from a first user (John Doe) to a second user (Jane Smith). The first user may broadcast the transaction 1106, via the first user's client device 110, to blockchain 1102 to be included in a block, such as block 1104.

The transaction 1106 may include a transaction ID and an originator such as John Doe (identified by a cryptographic proof-of-identity and a blockchain address for John Doe). The transaction 1106 may also include an indication that the transaction 1106 is a transfer of a particular digital token, a blockchain address at which to transfer the digital token (Jane Smith's blockchain address), and the amount of the digital token to transfer (4+5i).

Furthermore, the transaction 1106 may include a cryptographic hash of the transaction information including the to and from addresses and the transfer amount. In another implementation, the information regarding the to and from address and the transfer amount is not stored as a cryptographic hash, but is directly accessible in block 1104 by an observer or other network participant.

In some implementations, the digital token is a fungible token where one unit of the digital token is the same as any other unit of the digital token and the units of the digital token can be traded or exchanged for each other. For example, if user A wants to obtain 1+3i digital tokens, and both user B and user C have 1+3i digital tokens, it does not matter whether user A obtains the 1+3i digital tokens from user B or user C. In these implementations, the complex token system 100 may use an unspent transaction output (UTXO) model to aggregate the amount of unspent outputs at a user's address to determine the complex digital token value at the user's address (e.g., 8+5i). Then when the user transfers a particular amount of digital tokens to another user (e.g., 4+2i), the validating network nodes 102, 150 determine whether the user's address has at least the particular amount of digital tokens as unspent outputs. If the user's address has at least the particular amount of digital tokens, the validating network nodes 102, 150 determine that the transaction satisfies the consensus rules and the particular mount of digital tokens are removed from the user's unspent outputs. The complex digital token value at the user's address is then reduced to the difference between the user's previous unspent outputs and the transaction value (e.g., 4+3i).

In other implementations, each of the digital tokens is represented as a non-fungible token (NFT) having a particular complex digital token value. For example, each NFT may have a unique token identifier and a particular complex digital token value, such as 7−5i. In these implementations, because the digital tokens are non-fungible they may not be aggregated to determine a total complex digital token value at an address, where portions of the total value can be transferred to other users. Instead, when an NFT is minted for a particular digital token value, users can transfer the NFT to other users. For example, if user A mints a first NFT representing 2−2i digital tokens and a second NFT representing 3+3i digital tokens, user A can transfer the first NFT to user B, and the second NFT to user C. However, user A cannot simply aggregate the complex digital token values represented by the NFTs and transfer the values.

Also in some implementations, users may fractionalize the NFTs and sell a portion of an NFT to several users. For example, user A can transfer 0.1 of the first NFT to ten users. Each user that receives 0.1 of the first NFT may have 10% of the 2−2i digital tokens which the NFT represents or 0.2−0.2i digital tokens.

Figure 12:
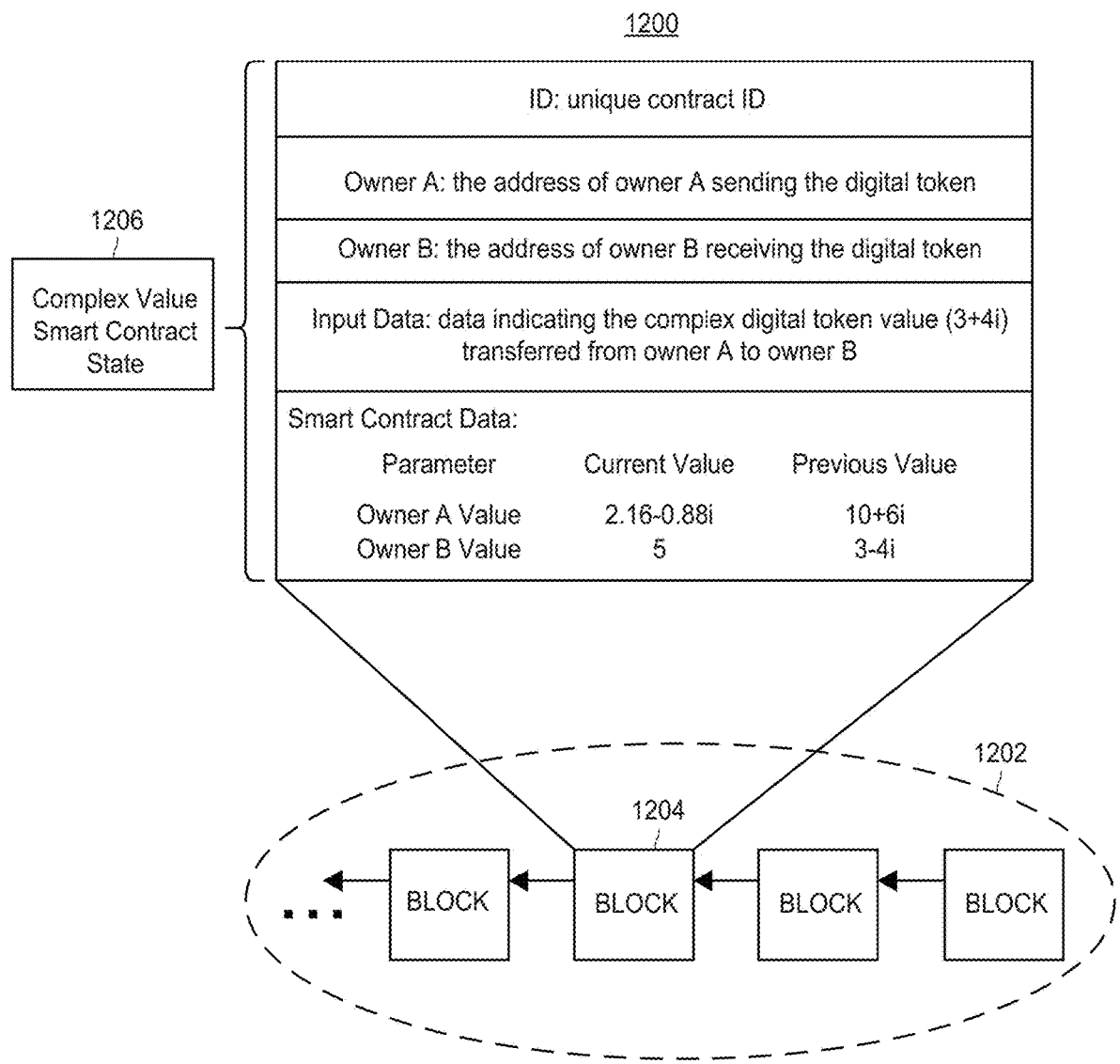
FIG. 12 illustrates an example complex value smart contract state on a distributed ledger network for determining the overall digital token value owned by a particular address/user.

As an alternative to the UTXO model for determining users' digital token values, the complex token system 100 may deploy a complex value smart contract to the distributed ledger to determine the digital token value owned by each user or address. FIG. 12 depicts an exemplary complex value smart contract state 1206 in a distributed ledger network for determining the overall digital token value owned by a particular address/user. The smart contract may be deployed by any participant in the blockchain network (e.g., a client device 110) to establish the complex value smart contract state 1206 for aggregating complex digital token values sent to a particular address/user. The deployed smart contract may expose methods and data to other participants in the blockchain network. Some of the data in the smart contract state may be private data that may only be altered by calling a method of the smart contract or only altered by authorized blockchain participants.

One way of altering the complex value smart contract state 1206 is to broadcast a transaction to the blockchain 1202. If the broadcast transaction satisfies consensus rules, network validators may include the transaction in a block 1204. Inclusion in the blockchain 1202 of a transaction sending data to the smart contract may cause validating nodes to update a state database, thus allowing network participants access to a rich state mechanism.

Complex value smart contract state 1206 may include pieces of data to identify the smart contract, such a contract ID. The contract owner may also specify identities of owners of the digital token. In at least one implementation, the owners are identified by cryptographic public keys assigned to the respective owners. Subsequent data sent to the smart contract may include a message signed by private keys corresponding to the public keys identifying the owners in the smart contract, thus providing cryptographic proof that a transaction was originated by one of the owners. The private and public keys may be managed solely by the owners to minimize the attack surface for any attackers that might attempt to forge a transaction (e.g., the owners generate public/private cryptographic key pairs offline and only provide the public key to other network participants). An owner's private keys may be generated according to a securely stored seed value (e.g., on a piece of physical paper or multiple copies of a piece of paper) such that the private keys may be recovered in the case of a data loss.

In some implementations, the complex value smart contract state 1206 may indicate a quadrant or quadrants of the complex number plane that the digital token values must stay within. For example, if the smart contract requires the digital tokens to operate in Quadrant I, the real number component and the imaginary component of each digital token value must be positive, and/or the phase of a digital token value may not exceed $\pi/2$. The smart contract may combine multiple digital token values transferred to a particular user/address in such a way that the combined phase does not exceed π/2. In other implementations, the digital tokens may have values in any of the four quadrants of the complex number plane.

Another aspect of the complex value smart contract state 1206 is the smart contract data. Smart contract data may be thought of like the private and public data in an object created according to an object-oriented programming paradigm in that they may be directly updated from outside the object or they may be updated only in limited ways, such as by calling a function of the smart contract. In at least one implementation, smart contract data includes indications of the complex digital token values at each owner's address. When digital tokens are transferred amongst users, the smart contract data may include indications of the previous complex digital token values before the transfer and the current digital token values after the transfer.

In an example scenario, an owner (owner A) may broadcast a transaction to the blockchain 1202, and more specifically, the smart contract indicating a transfer of 3+4i digital tokens to owner B. For example, owner A may call a function in the smart contract for transferring digital tokens from one address to another address and may provide owner A's address, owner B's address, and the amount of the digital token to transfer (3+4i) to the function.

In response to owner A calling the function, the smart contract may transfer 3+4i digital tokens from owner A's address to owner B's address. To transfer the digital tokens, the smart contract may increase the real number component of owner B's digital tokens by 3 to generate an overall real number value owned by owner B, and may increase the imaginary number component of owner B's digital tokens by 4i to generate an overall imaginary number value owned by owner B. The complex value smart contract may also determine the magnitude of the digital tokens owned by owner B as the square root of the sum of the squares of the overall real number value and the imaginary real number value, and the phase as the inverse tangent of the overall imaginary number value over the overall real number value.

Additionally, the smart contract may decrease the real number component of owner A's digital tokens by 3 to generate an overall real number value owned by owner A, and may decrease the imaginary number component of owner A's digital tokens by 4i to generate an overall imaginary number value owned by owner A. The complex value smart contract may also determine the magnitude of the digital tokens owned by owner A as the square root of the sum of the squares of the overall real number value and the imaginary real number value, and the phase as the inverse tangent of the overall imaginary number value over the overall real number value.

In other implementations, the complex value smart contract may multiply each of the complex digital token values owned by a particular user or address to generate an overall complex digital token value owned by the particular user or address. In yet other implementations, the complex value smart contract may add complex digital token values in some instances and multiply complex digital token values in other instances. For example, if owner A initially obtains 10+6i digital tokens, the complex value smart contract may determine that owner A has 10+6i digital tokens. Then in the example shown in FIG. 12, owner A transfers 3+4i digital tokens to owner B who has 3−4i digital tokens. The complex value smart contract may multiply (3−4i)*(3+4i) to determine that owner B has 25 digital tokens. To determine owner A's current value, the complex value smart contract may divide owner A's previous value 10+6i by 3+4i to determine that owner A has 2.16−0.88i digital tokens.

The complex token system 100 may also deploy a complex value exchange smart contract to the distributed ledger to allow users to buy and sell cryptocurrencies, fiat currencies, or other assets using the digital token having complex values. In this manner, the complex token system 100 may provide a decentralized exchange for trading complex digital token values.

Figure 13:
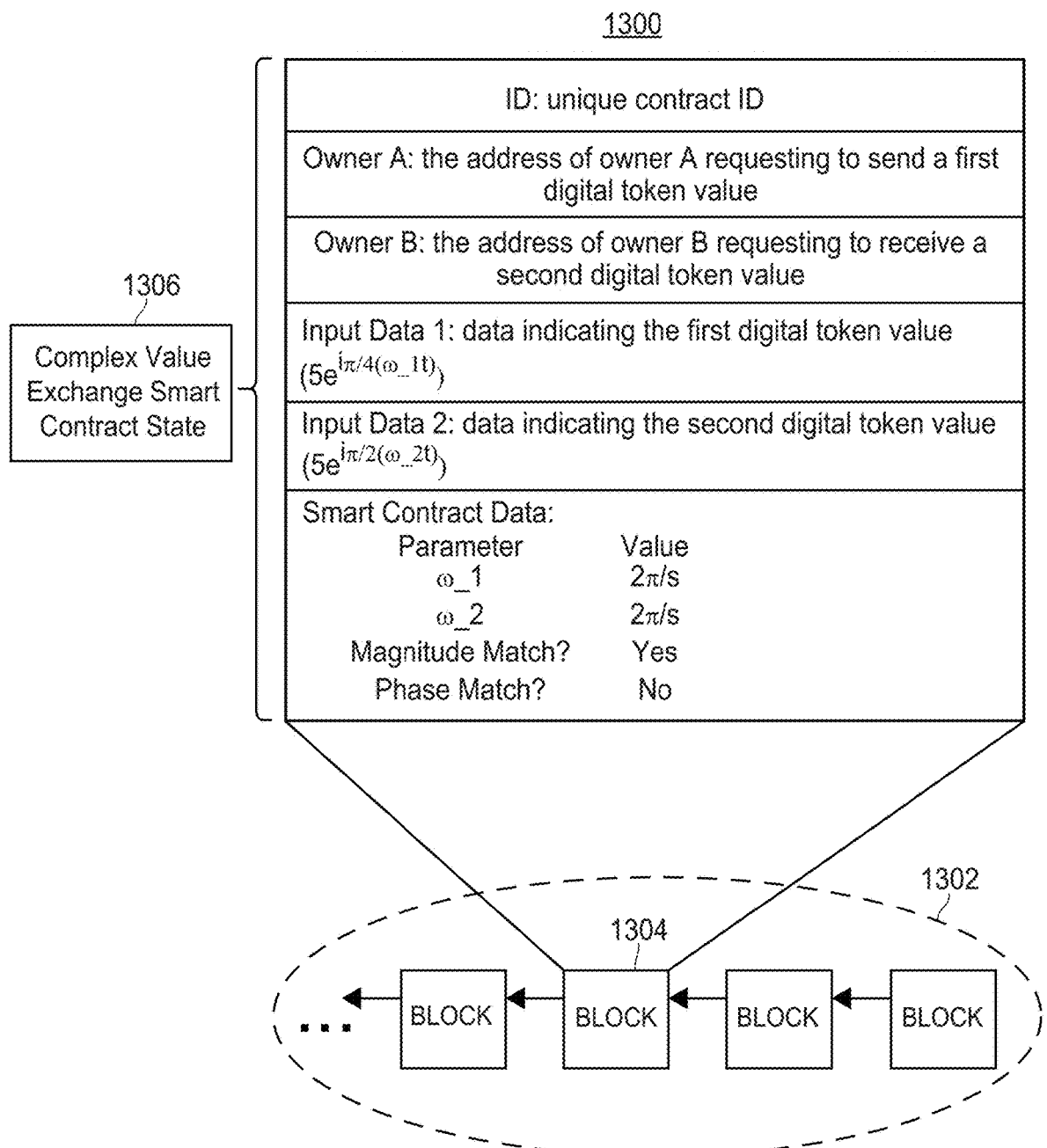
FIG. 13 illustrates an example complex value exchange smart contract state on a distributed ledger network for determining when to match a buyer with a seller of a digital token.

FIG. 13 depicts an exemplary complex value exchange smart contract state 1306 in a distributed ledger network for matching buyers and sellers based on the magnitudes of the bid and ask prices, the phase of the bid and ask prices, and/or some combination thereof. The smart contract may be deployed by any participant in the blockchain network (e.g., a client device 110) to establish the complex value exchange smart contract state 1306 for exchanging complex digital token values between parties. The deployed smart contract may expose methods and data to other participants in the blockchain network. For example, the smart contract may include a function for receiving requests to receive and transmit complex digital token values (e.g., bid and ask prices). The function may identify parties requesting to transmit and receive the same complex digital token value (e.g., both parties request to transmit and receive 2−5i digital tokens, or the magnitude and the current phase of the bid and ask prices are the same at a particular time interval). Then the function may exchange the matching complex digital token value between the identified parties. Some of the data in the smart contract state may be private data that may only be altered by calling a method of the smart contract or only altered by authorized blockchain participants.

One way of altering the smart contract state 1306 is to broadcast a transaction to the blockchain 1302. If the broadcast transaction satisfies consensus rules, network validators may include the transaction in a block 1304. Inclusion in the blockchain 1302 of a transaction sending data to the smart contract may cause validating nodes to update a state database, thus allowing network participants access to a rich state mechanism.

Complex value exchange smart contract state 1306 may include pieces of data to identify the smart contract, such a contract ID. The contract owner may also specify identities of owners of the digital token. In at least one implementation, the owners are identified by cryptographic public keys assigned to the respective owners. Subsequent data sent to the smart contract may include a message signed by private keys corresponding to the public keys identifying the owners in the smart contract, thus providing cryptographic proof that a transaction was originated by one of the owners. The private and public keys may be managed solely by the owners to minimize the attack surface for any attackers that might attempt to forge a transaction (e.g., the owners generate public/private cryptographic key pairs offline and only provide the public key to other network participants). An owner's private keys may be generated according to a securely stored seed value (e.g., on a piece of physical paper or multiple copies of a piece of paper) such that the private keys may be recovered in the case of a data loss.

A user (owner A) requesting to buy a cryptocurrency, fiat currency, or other asset for no more than a maximum amount of digital tokens may broadcast a transaction to the blockchain 1302, and more specifically, the smart contract indicating a request to buy a particular cryptocurrency, fiat currency, or other asset for a first digital token value (the bid price). Owner A may specify that the first digital token value is $5e^{i\pi/4}$. Owner A may also request a particular frequency in which the first digital token value will change over time by for example, transmitting a transaction fee to the smart contract. In other implementations, the smart contract includes a default frequency for the first digital token value. The first digital token value may be represented as $5e^{i\pi/4(\omega\_1 t)}$, where $\omega\_1$ is the first frequency for the first digital token value.

A user (owner B) requesting to sell a cryptocurrency, fiat currency, or other asset for no less than a minimum amount of digital tokens may broadcast a transaction to the blockchain 1302, and more specifically, the smart contract indicating a request to sell a particular cryptocurrency, fiat currency, or other asset for a second digital token value (the ask price). Owner B may specify that the second digital token value is $5e^{i\pi/2}$. Owner B may also request a particular frequency in which the second digital token value will change over time by for example, transmitting a transaction fee to the smart contract. In other implementations, the smart contract includes a default frequency for the second digital token value. The second digital token value may be represented as $5e^{i\pi/2(\omega\_2 t)}$, where $\omega\_2$ is the second frequency for the second digital token value.

Another aspect of the complex value exchange smart contract state 1306 is the smart contract data. Smart contract data may be thought of like the private and public data in an object created according to an object-oriented programming paradigm in that they may be directly updated from outside the object or they may be updated only in limited ways, such as by calling a function of the smart contract. In at least one implementation, smart contract data includes the frequency values for the first and second digital token values, $\omega\_1$, $\omega\_2$. The first frequency value ($\omega\_1$) may be $2\pi$ radians per second, and the second frequency value ($\omega\_2$) may also be $2\pi$ radians per second. In other scenarios, the first and second frequency values are different and are determined based on the transaction fees that the respective owners sent to the smart contract. In yet other scenarios, one or both of the frequency values may be set to 0 so that the corresponding digital token value(s) do(es) not change over time.

A function of the smart contract may determine whether the first and second digital token values match at a particular time interval. For example, the smart contract may determine whether the magnitudes match at the particular time interval and adjust the smart contract data to indicate whether the magnitudes match. The smart contract may also determine whether the current phases match at the particular time interval and adjust the smart contract data to indicate whether the current phases match.

The complex value exchange smart contract may set the rules for when to match a bid price with an ask price. In some implementations, the smart contract may identify a match between a bid price and an ask price when the magnitudes match or when the real number components match. In other implementations, the smart contract may identify a match between a bid price and an ask price when both the magnitudes and the phases match or both the real number components and the imaginary components match. The complex value exchange smart contract may also adjust the bid price and/or the ask price based on the respective frequencies assigned to the bid price and the ask price and the current time interval. The smart contract may identify a match when the current bid price and/or ask price match at a particular time interval.

Then in response to identifying a match, the complex value exchange smart contract may exchange the digital token value from owner A to owner B and record the transfer in the distributed ledger. For example, the complex value exchange smart contract may call function from the complex value smart contract in FIG. 12 to execute the transfer.

This detailed description is to be construed as exemplary only and does not describe every possible embodiment, as describing every possible embodiment would be impractical, if not impossible. One may implement numerous alternate embodiments, using either current technology or technology developed after the filing date of this application.

Although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112 (f) unless traditional means-plus-function language is expressly recited, such as "means for" or "step for" language being explicitly recited in the claim(s).

What is claimed:

1. A method for deploying a smart contract for managing exchanges of real and imaginary value using a distributed ledger maintained by a plurality of participants, the method comprising:

generating, by one or more processors, a smart contract configured to:
receive requests to receive and transmit digital token values, wherein the digital token values are complex number values having a magnitude, an initial phase, and a frequency component, such that a phase of the digital token value changes over time in accordance with the frequency component;

identify parties requesting to transmit and receive a same digital token value; and exchange the same digital token value between the identified parties; and deploying, by the one or more processors, the smart contract to an address stored on the distributed ledger maintained by the plurality of participants in a distributed ledger network.

2. The method of claim 1, wherein the smart contract is further configured to determine that a first party requesting to transmit a first digital token value and a second party requesting to receive a second digital token value are requesting to transmit and receive the same digital token value when a first magnitude of the first digital token value matches a second magnitude of the second digital token value.

3. The method of claim 1, wherein the smart contract is further configured to determine that a first party requesting to transmit a first digital token value and a second party requesting to receive a second digital token value are requesting to transmit and receive the same digital token value when a second phase of the second digital token value matches a combination of a first phase of the first digital token value, a first frequency component of the first digital token value, and a current time.

4. The method of claim 3, wherein the smart contract is further configured to set a same frequency component value for each digital token value included in the requests.

5. The method of claim 3, wherein the smart contract is further configured to adjust the first frequency component based on a transaction fee provided to the smart contract.

6. The method of claim 1, wherein the frequency component of each digital token value is a first frequency component, a coordinate system for the digital token value rotates at a rate corresponding to a second frequency component, and the phase of the digital token value is determined based on a combination of the initial phase of the digital token value, the first frequency component for the digital token value, the second frequency component for the coordinate system, and a current time.

7. A computer system for deploying a smart contract for managing exchanges of real and imaginary value using a distributed ledger maintained by a plurality of participants comprising:

one or more processors; and a non-transitory computer-readable memory storing instructions thereon that, when executed by the one or more processors, cause the computer system to:

generate a smart contract configured to:

receive requests to receive and transmit digital token values, wherein the digital token values are complex number values having a magnitude, an initial phase, and a frequency component, such that a phase of the digital token value changes over time in accordance with the frequency component;

identify parties requesting to transmit and receive a same digital token value; and exchange the same digital token value between the identified parties; and deploy the smart contract to an address stored on the distributed ledger maintained by the plurality of participants in a distributed ledger network.

8. The computer system of claim 7, wherein the smart contract is further configured to determine that a first party requesting to transmit a first digital token value and a second party requesting to receive a second digital token value are requesting to transmit and receive the same digital token value when a first magnitude of the first digital token value matches a second magnitude of the second digital token value.

9. The computer system of claim 7, wherein the smart contract is further configured to determine that a first party requesting to transmit a first digital token value and a second party requesting to receive a second digital token value are requesting to transmit and receive the same digital token value when a second phase of the second digital token value matches a combination of a first phase of the first digital token value, a first frequency component of the first digital token value, and a current time.

10. The computer system of claim 9, wherein the smart contract is further configured to set a same frequency component value for each digital token value included in the requests.

11. The computer system of claim 7, wherein the frequency component of each digital token value is a first frequency component, a coordinate system for the digital token value rotates at a rate corresponding to a second frequency component, and the phase of the digital token value is determined based on a combination of the initial phase of the digital token value, the first frequency component for the digital token value, the second frequency component for the coordinate system, and a current time.

12. A non-transitory computer-readable memory storing instructions thereon that, when executed by the one or more processors, cause the one or more processors to:

generate a smart contract configured to:

receive requests to receive and transmit digital token values, wherein the digital token values are complex number values having a magnitude, an initial phase, and a frequency component, such that a phase of the digital token value changes over time in accordance with the frequency component;

identify parties requesting to transmit and receive a same digital token value; and exchange the same digital token value between the identified parties; and deploy the smart contract to an address stored on the distributed ledger maintained by the plurality of participants in a distributed ledger network.

13. The non-transitory computer-readable memory of claim 12, wherein the smart contract is further configured to determine that a first party requesting to transmit a first digital token value and a second party requesting to receive a second digital token value are requesting to transmit and receive the same digital token value when a first magnitude of the first digital token value matches a second magnitude of the second digital token value.

14. The non-transitory computer-readable memory of claim 12, wherein the smart contract is further configured to determine that a first party requesting to transmit a first digital token value and a second party requesting to receive a second digital token value are requesting to transmit and receive the same digital token value when a second phase of the second digital token value matches a combination of a first phase of the first digital token value, a first frequency component of the first digital token value, and a current time.

* * * * *